J. Kuebler,
Cotton Press.
N°37,475.  Patented Jan. 20, 1863.
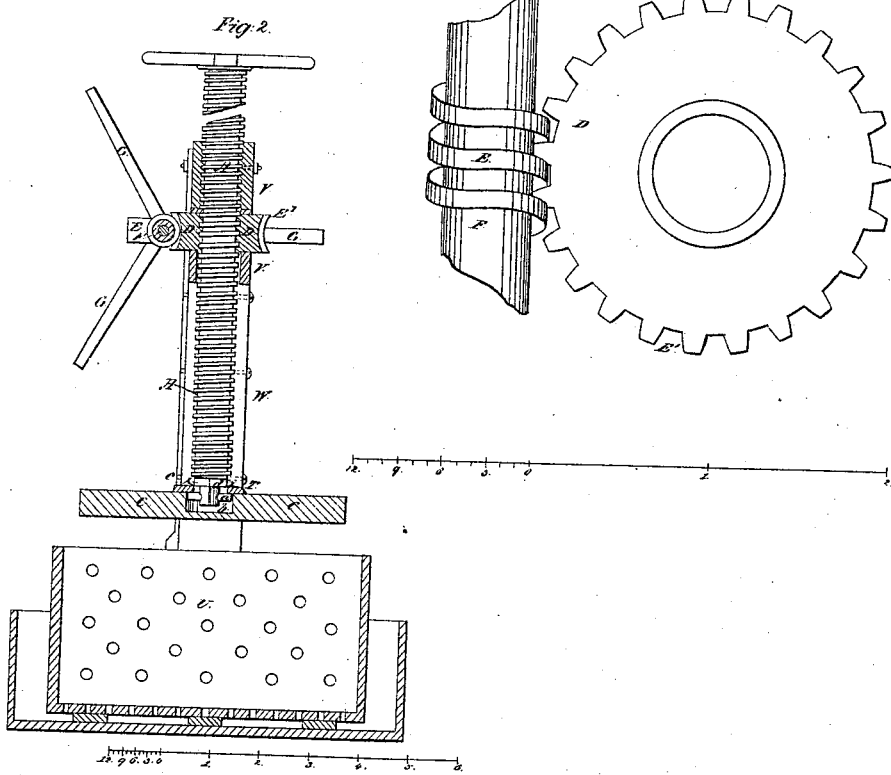
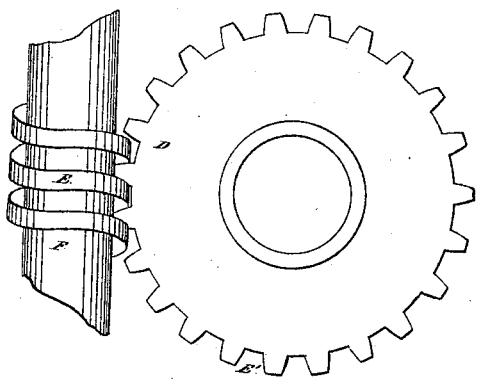
Witnesses:
Inventor:
John Kuebler

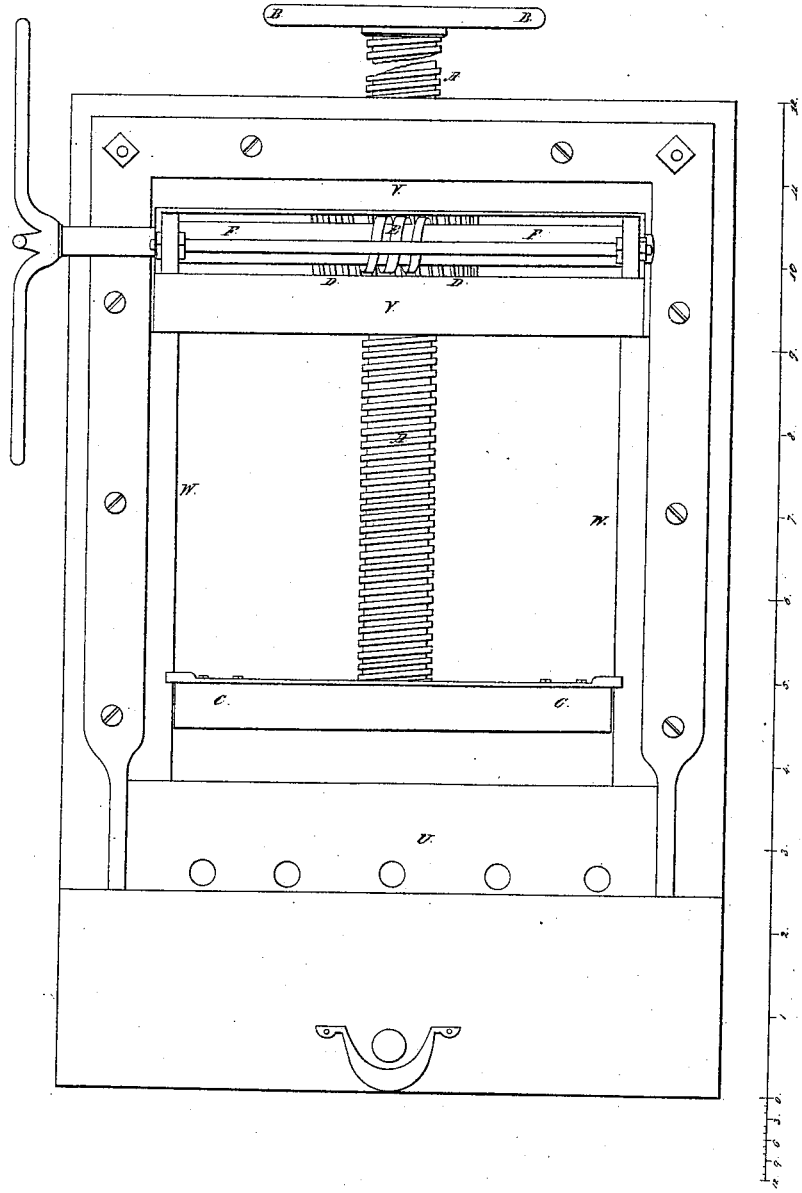

UNITED STATES PATENT OFFICE.

JOHN KUEBLER, OF BELLEVILLE, ILLINOIS, ASSIGNOR TO J. P. PIGGOTT AND HENRY RENTCHLER, OF SAME PLACE.

IMPROVEMENT IN PRESSES.

Specification forming part of Letters Patent No. 37,475, dated January 20, 1863.

*To all whom it may concern:*

Be it known that I, JOHN KUEBLER, of Belleville, in the county of St. Clair and State of Illinois, have invented a new and useful Improvement in Presses; and I do hereby declare that the following is a full, clear, and exact description of the same, reference being had to the accompanying drawings, forming part of this specification, in which—

Figure 1 is an elevation of my improved press. Fig. 2 is a vertical central section of the same on a reduced scale. Fig. 3 is a horizontal view of a portion of the same. Fig. 4 is a horizontal section in the line $x\,x$ of Fig. 2.

The same letters of reference in the several figures indicate corresponding parts.

The nature of my invention consists in so organizing a screw-press or other similar mechanical power that the screw may be revolved rapidly while the nut remains stationary, and then the nut revolved slowly while the screw remains stationary. To this end I have provided a changeable connection between the follower of the press or the equivalent of the follower, which connection may consist of a combined many-sided and a round socket in the follower, and a coupling-pin and a many-sided end on the lower terminus of the screw. This organization is such that as the screw and nut alternately are caused to revolve the square and round of the socket alternately change their connection with the screw; or, in other words, when the follower is suspended by the screw above the article to be pressed, the round portion of the socket automatically comes into position and allows the screw to be revolved while the nut remains stationary; but when the follower rests down with force upon the article to be pressed the square portion of the socket or of the screw automatically comes into position and holds the screw stationary while the nut is revolved.

To enable others skilled in the art to make and use my invention, I will proceed to describe the same with reference to the drawings.

A is a vertical screw with a hand-wheel, B, at its top, and a follower, C C, at its bottom. The lower end of the screw may terminate in a reduced plain cylindrical portion, and intermediate this portion and the screw a square or any other many-sided figure may be formed, and pin $a$ be passed through the cylindric portion so as to protrude beyond two of the flat sides of the square. The follower may have a deep circular socket, $b$, in the center of its top, or the socket may be of any form so long as it admits of the protruding ends of the pin $a$ into it, and affords room for them as the screw carries them around. Above this socket, on the same vertical line, a smaller hole, $c$, of many-sided form, is cut through the cross-bar T of the follower. This bar is made separate from the follower, but is screwed down upon the same after the lower end of the screw has been passed through the hole $c$ and the pin $a$ passed through said end of the screw. When the bar is screwed down upon the follower, the screw has a chance to play up and down in the socket $b$, but it cannot disconnect from the follower entirely. It is evident that if the square or many-sided portion $d$ of the screw fits down into the square or many-sided portion $c$ of the socket, the screw cannot revolve independent of the follower, and as the follower is many-sided and works in a many-side pressing-box, U, the follower and the screw remain stationary so far as chances to revolve goes; but if the many-sided portion $d$ of the screw be above the many-sided portion $c$ of the socket the screw will have a chance to revolve, as the portion of the screw below the part $d$ is smaller in diameter than the portion $c$ of the socket, and as the socket $b$ allows room for the revolution of the ends of the pin $a$ with the screw. It is by the gravity of the follower that the square part of the screw ungears from the square part $c$ of the socket, and it is by the resistance of the article being pressed to the follower that the regearing of these parts is effected.

D is a nut through which the screw passes. It is confined from vertical play by means of strong cross-beams V V of the press-frame W; but it has freedom to revolve at such periods as when it is employed to transmit power to the screw. The circumference of the nut may be provided with cog-teeth E′, adapted to gear with a worm, E, as represented; or it may have bevel-teeth, so as to gear with a bevel-pinion. The shaft E of the worm or bevel-pinion extends across the frame, and is furnished at one or both ends with a pilot-wheel or levers, G G, as represented. The application of power to the circumference of the nut, as represented, decreases the speed, but gives an increase of leverage power.

In operating with a press it is desirable to have a quick speed while opening and closing the press, or at such times as when the follower is being lowered to the work and raised from the pressed substances. It is also desirable to have a slow speed and increased power commensurate with the gradually-increasing resistance offered to the follower as the pressing progresses. It is further desirable to keep the screw stationary in order to obviate friction when such decreased speed and increased power is brought into use. Now, by my organization I can operate the screw A directly with the hand-wheel B, and thus open and close the press rapidly, as the follower does not during such operation interfere with the revolution of the screw. Again, I can operate the screw indirectly with the levers G G, and thus have the desired decreased speed and increased power, and at the same time have the screw remain stationary so far as revolution goes, as the nut becomes the revolving actuator of the screw, and as the screw is locked by the square portion $d$ and the square part $c$ of the socket $b$.

The advantages of my press are great compactness, great leverage power, and convenience to the operator in the management of the parts.

I would here suggest that my invention might be applied to many analogous purposes, such as punching, cutting, elevating, &c.

What I claim, and desire to secure by Letters Patent, is—

The construction of a press or other similar mechanical power in such manner that the screw and nut may be alternately revolved, and when thus revolved the connection between the follower and the screw will automatically adapt itself thereto, substantially as and for the purposes set forth.

JOHN KUEBLER.

Witnesses:
  M. MEDART,
  CASPER THIELL.